United States Patent [19]
Parker

[11] 3,971,308
[45] July 27, 1976

[54] PORTABLE SMOKEHOUSE
[76] Inventor: Darrell G. Parker, F.M. 159, P.O. Box 422, Millican, Tex. 77866
[22] Filed: July 21, 1975
[21] Appl. No.: 597,801

[52] U.S. Cl. ............................... 99/467; 99/476
[51] Int. Cl.² ........................................ A23B 4/04
[58] Field of Search .................. 99/467, 293–294, 99/340, 352–353, 359, 361, 403, 426, 470–471, 473–474, 475–476, 481–482, 487; 126/59.5; 426/235, 263, 302, 312, 314–315, 321, 331–332, 442

[56] References Cited
UNITED STATES PATENTS

| | | | |
|---|---|---|---|
| 127,994 | 6/1872 | Story | 99/467 |
| 2,338,156 | 1/1944 | Allen | 426/314 |
| 2,505,973 | 5/1950 | Julian | 99/476 X |
| 2,930,310 | 3/1960 | Poppenburg | 99/476 |
| 3,592,668 | 7/1971 | Denk | 99/467 X |
| 3,747,513 | 7/1973 | Seelbach | 99/476 |

FOREIGN PATENTS OR APPLICATIONS

| | | | |
|---|---|---|---|
| 13,924 | 6/1956 | Germany | 99/482 |
| 867,947 | 2/1953 | Germany | 99/482 |
| 210,331 | 7/1940 | Switzerland | 99/467 |

*Primary Examiner*—Leonard D. Christian
*Assistant Examiner*—Arthur O. Henderson
*Attorney, Agent, or Firm*—Michael P. Breston

[57] ABSTRACT

The portable smokehouse is box-shaped and comprises a plurality of transverse walls forming at least, in vertically spaced relation from top to bottom: a comestible chamber and a fire box. Smoke is carried into the comestible chamber. A removable insulation pack allows the smokehouse to be selectively used either as a barbeque pit or as a smokehouse.

4 Claims, 4 Drawing Figures

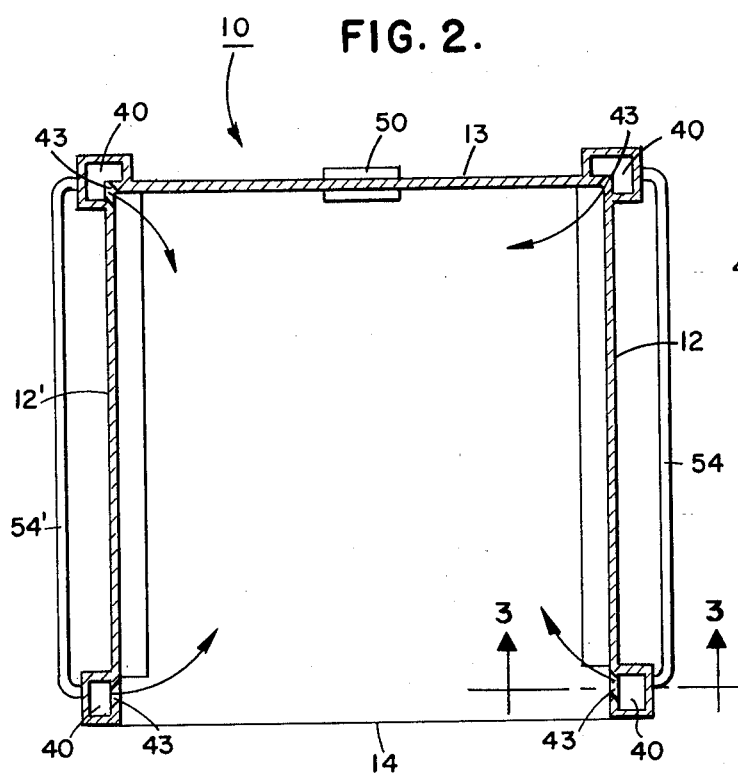
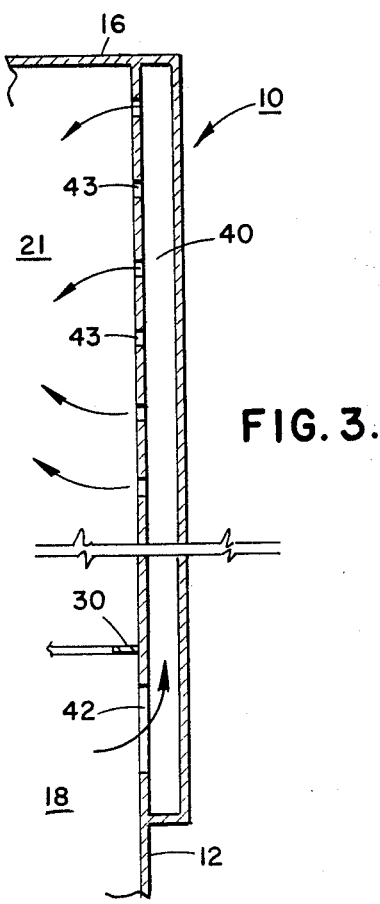
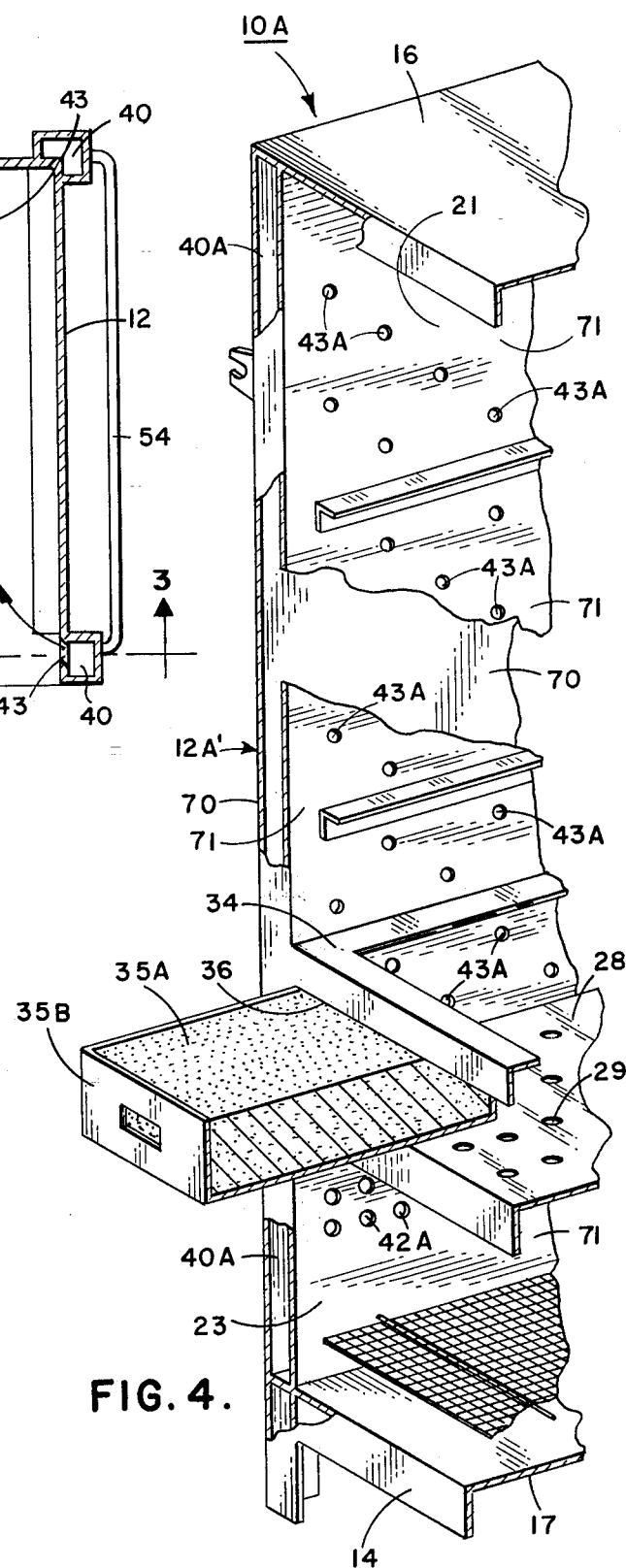

PORTABLE SMOKEHOUSE

BACKGROUND OF THE INVENTION

Various types of smokehouses are known for the purpose of smoking comestibles such as meat, fish, cheese, etc., using smoke which is produced by a wood fuel. The smoke is carried into a smoke chamber by suitable ducts. In such a process it is desired to control the amount of heat being carried by the mixture of air and smoke gases, to prevent the comestibles from drying out. Smokehouses of the above described type usually are used for industrial applications and are therefore large in size and weight.

There has been a long need for a portable smokehouse which is suitable for city dwellers and yet provide smoked comestibles with the quality commensurate with the smokehouses used by industry.

Accordingly, it is an object of the present invention to provide a portable smokehouse which is inexpensive to manufacture which is versatile, and can be selectively used as a barbecue or smokehouse.

SUMMARY OF THE INVENTION

The portable smokehouse of this invention comprises a box-shaped housing having a top, a bottom, rear, front, and side walls between the top and bottom. In one embodiment, a plurality of transverse walls vertically spaced-apart between the top and the bottom form in vertically descending order: a comestible chamber, an insulated chamber, a smoke-collecting chamber, and a fire box. Smoke carrying ducts communicate between the smoke-collecting and the comestible chambers. The insulated chamber contains a removable insulation pack allowing the smokehouse to be selectively used as a barbecue pit or as a smokehouse. In another embodiment, the smoke and insulated chambers are combined.

BRIEF DESCRIPTION OF THE DRAWINGS

FIG. 2 is a horizontal sectional view taken through the upper portion of the smokehouse;

FIG. 3 is a sectional view on line 3—3 in FIG. 2; and

FIG. 4 is a fragmentary view of another embodiment.

DETAILED DESCRIPTION OF THE PREFERRED EMBODIMENT

Figure 1:
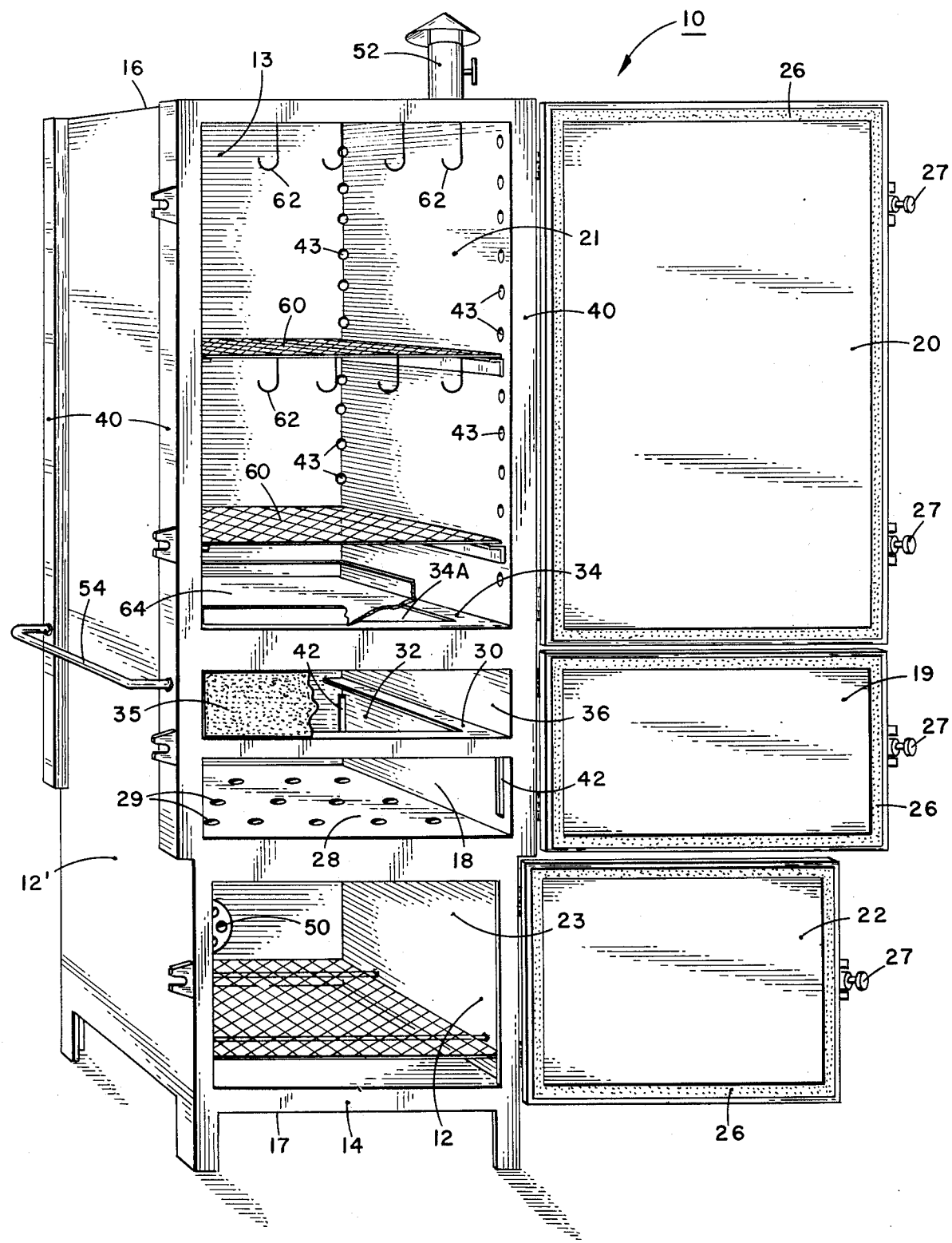
FIG. 1 is a view in perspective of one embodiment of the smokehouse of this invention.

Referring now to the drawings in which like reference numerals designate like parts, the portable smokehouse (FIGS. 1–3) has a box-shaped housing 10 having sidewalls 12, 12', a rear wall 13, a front wall 14, a top wall 16 and a bottom wall 17. The metal used for constructing the smokehouse can be sheet iron, or preferably aluminum. The walls are secured in any desired manner, for example, they can be welded at the wall joints. The front wall is provided with doors 19, 20 and 22 (FIG. 1). Door 20 allows access to the comestible chamber 21; door 22 allows access into a firebox 23; and door 19 allows access to a smoke chamber 18. The doors are made airtight by means of suitable gaskets 26. Suitable latches 27 are provided on the doors to allow them to be closed air tight.

A transverse wall 28 above the firebox 23 has perforations 29 therein. Vertically spaced from perforated plate 28 is another transverse wall 30 defining a rectangular opening 32. The chamber defined between walls 28 and 30 serves as the smoke collection box 18. Wall 30 is vertically positioned below a transverse wall 34 which is the bottom wall of the comestible chamber 21. Walls 30 and 34 define therebetween an insulated chamber 36 which can be filled with an insulation pack 35 that prevents direct heat transfer between the smoke collection box 18 and the comestible chamber 21. Wall 34 defines a rectangular opening 34A of a size comparable to opening 32.

Four vertically extending smoke-carrying ducts 40 are provided, each preferably positioned at each corner of the smokehouse, for the purpose of carrying smoke from the smoke collecting box 18 into the comestible chamber 21. Smoke enters the ducts 40 through vertical slots 42 positioned between walls 28 and 30. The smoke flows upward in ducts 40, past the insulated chamber 36, and then enters the comestible chamber 21 by way of vertically spaced apart perforations 43.

An adjustable air inlet 50 in the back wall 13 of firebox 23 allows fresh air to enter into the firebox. An adjustable vent 52 in the top 16 vents the comestible chamber to the atmosphere. The side walls 12, 12' are provided with two handles 54, 54' to allow it to be carried by two men.

To accommodate different sizes and shapes of comestibles, a plurality of slidable racks 60 made of screening as well as a plurality of hooks 62 are provided inside the comestible chamber 21. A removable drip pan 64 is positioned on the bottom wall 34 of the comestible chamber 21 to catch the liquids produced by the smoking process.

The insulation pack 35 is removable through door 19 thereby allowing direct heat as well as smoke to enter the comestible chamber 21. The heat will pass directly from firebox 23 through openings 32 and 34A when the insulation pack 35 is removed from the smokehouse. Hence, the smokehouse can be selectively used as a barbecue pit, or as a smokehouse, or both.

In operation, the fuel is continuously decomposed in the fire box 23. When the insulation pack 35 is not removed from the smokehouse, the smoke, as it is being produced, is drawn through the four ducts 40 into the comestible chamber 21. The woodsmoke is applied to the comestibles either by suspending the products in the comestible chamber or by laying them on the screened racks. As can be seen from the drawings, the racks and pans can be easily removed for cleaning purposes.

In the simplified embodiment of FIG. 4 there is shown a box-shaped housing 10A having a double sidewall 12A', a front wall 14, a top wall 16 and a bottom wall 17. The front wall is provided with only two doors (not shown). One door allows access to the comestible chamber 21; the other door allows access into the firebox 23. A transverse wall 28 above the firebox 23 has perforations 29 therein. Vertically spaced from perforated plate 28 is another transverse wall 34 which is the bottom wall of the comestible chamber 21. Walls 29 and 34 define therebetween an insulated chamber 36 which can be filled with an insulation pack 35A in a slidably mounted tray 35B that prevents direct heat transfer between the firebox 23 and the comestible chamber 21. Wall 34 defines a rectangular opening 34A.

The double wall 12A' consists of an outer panel 70 and an inner panel 71 forming a passage 40A for the purpose of carrying smoke from the firebox 23 into the comestible chamber 21. Smoke enters the double wall 12A' through openings 42A. The smoke flows upward in passage 40A, past the insulated tray 35B, and then enters the comestible chamber 21 by way of the vertically spaced apart perforations 43A.

The operation of the simplified embodiment of FIG. 4 is similar to the embodiment of FIG. 1, as will be apparent to those skilled in the art.

Various other modifications may be made in the illustrated embodiments and all such modifications are desired to be covered by the claims attached hereto.

What is claimed is:

1. A portable smokehouse having a box-shaped housing, comprising:
    a top wall, a bottom wall, a rear wall, a front wall, and side walls between said top and bottom walls;
    means vertically spaced below said top wall forming a comestible chamber therebetween;
    said means and said bottom wall forming a firebox therebetween;
    vertically positioned duct means in smoke communication between said firebox and said comestible chamber for carrying smoke into said comestible chamber and;
    a heat insulating tray removably positioned above said firebox whereby when said tray is removed from said housing, heat and smoke will move directly from said fire box into said comestible chamber.

2. The smokehouse of claim 1 wherein said housing has double sidewalls forming said duct means.

3. A portable smokehouse having a box-shaped housing, comprising:
    a top wall, a bottom wall, a rear wall, a front wall, and side walls between said top and bottom walls;
    a first transverse wall vertically spaced below said top wall forming a comestible chamber therebetween;
    a second transverse wall vertically positioned below said first transverse wall forming an insulated chamber therebetween;
    a third transverse wall vertically positioned below said second transverse wall forming a smoke collecting chamber therebetween;
    said third transverse wall and said bottom wall forming a fire box therebetween for a smoke-producing combustible product;
    a heat insulating pack removably positioned in said insulated chamber;
    said third transverse wall having an opening allowing smoke to enter from said fire box into said smoke-collecting chamber;
    vertically spaced-apart ducts in fluid communicaton between said smoke-collecting chamber and said comestible chamber for carrying smoke into said comestible chamber;
    said second transverse wall having an opening therein;
    said first transverse wall having an opening therein whereby, when said insulating pack is removed from said insulated chamber, heat and smoke will move directly through said openings from said fire box into said comestible chamber;
    an air inlet in the rear wall of said fire box allowing fresh air to enter into said fire box; and
    an adjustable vent in said comestible chamber for venting the comestible chamber to the atmosphere.

4. The smokehouse of claim 3, and
    a door for said comestible chamber, and
    a door for said smoke-collecting chamber.

* * * * *